J. S. TOTTEN.
Shaft and Pole Holder.

No. 94,361.                        Patented Aug. 31, 1869.

Witnesses:                        Inventor:
Wm F. Clark                        J S Totten
Frank Blockley                    Per
                                         Attorneys.

United States Patent Office.

JAMES S. TOTTEN, OF LEBANON, OHIO.

Letters Patent No. 94,361, dated August 31, 1869.

IMPROVED SHAFT AND POLE-HOLDER.

The Schedule referred to in these Letters Patent and making part of the same

*To all whom it may concern:*

Be it known that I, JAMES S. TOTTEN, of Lebanon, in the county of Warren, and State of Ohio, have invented a new and useful Improvement in Shaft and Pole-Holders; and I do hereby declare that the following is a full, clear, and exact description thereof, which will enable others skilled in the art to make and use the same, reference being had to the accompanying drawings, forming part of this specification.

The object of this invention is to provide simple and convenient pole or shaft-holding attachments for carriages, to hold the shafts or poles in an elevated position when not in use, for convenience of storage, or for safety of the said poles or shafts.

The invention comprises the application of holding-straps, of any form or arrangement, when adapted for ready attachment to the spring-bars and shaft cross-bars, by buttons connected to one, and by buckling or looping around the other.

Figure 1 represents a sectional elevation of a part of a buggy, with the shafts suspended by my improved attachments, and Figures 2, 3, and 4, represent modified forms of the said holders.

Similar letters of reference indicate corresponding parts.

I propose to provide buttons, A, on the cross-bars B, of the shafts of a buggy, or on the pole; also, on the spring-bars C, for the ready attachment of holding-straps D, of any kind or shape, buckled or looped around the one and adapted for buttoning to the other, when required for holding the shafts or tongues in an elevated position.

These holding-straps may be of leather, metal, or any other suitable substance, and they are intended to be suspended from the bar they are buckled around when the carriage is in use, where they are in the most convenient place for attachment to the buttons when the shafts or poles are to be suspended.

Figure 1:
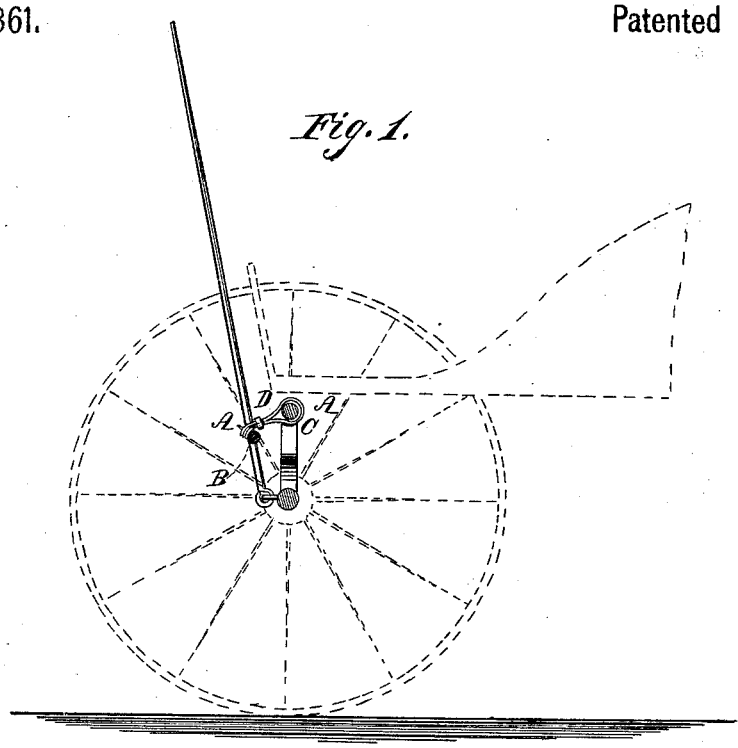
Figure 2:
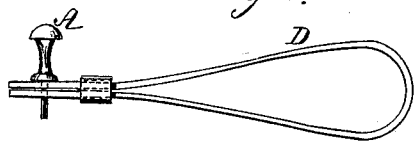
Fig. 2 represents a side elevation, and fig. 3, a plan of one arrangement of these holding-straps, adapted to loop around the spring-bar, and to button on to the other.
Figure 4:
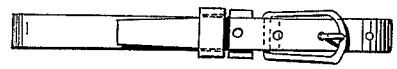
Fig. 4 represents a plan view of another construction, where the ends of the strap are buckled together, after passing around the spring-bar, and adapted to button to the other.
Figure 3:

I do not, however, design to limit myself to any particular arrangement or construction of these straps; but

Having thus described my invention,

I claim as new, and desire to secure by Letters Patent—

The combinations, with the spring-bar C of a carriage and the shaft-bar B, of holding-straps D, looped or buckled around the one, and adapted for buttoning to the other, substantially as specified.

JAMES S. TOTTEN.

Witnesses:
 WM. H. ROCKHILL,
 WM. S. DYNES.